Figure 1:
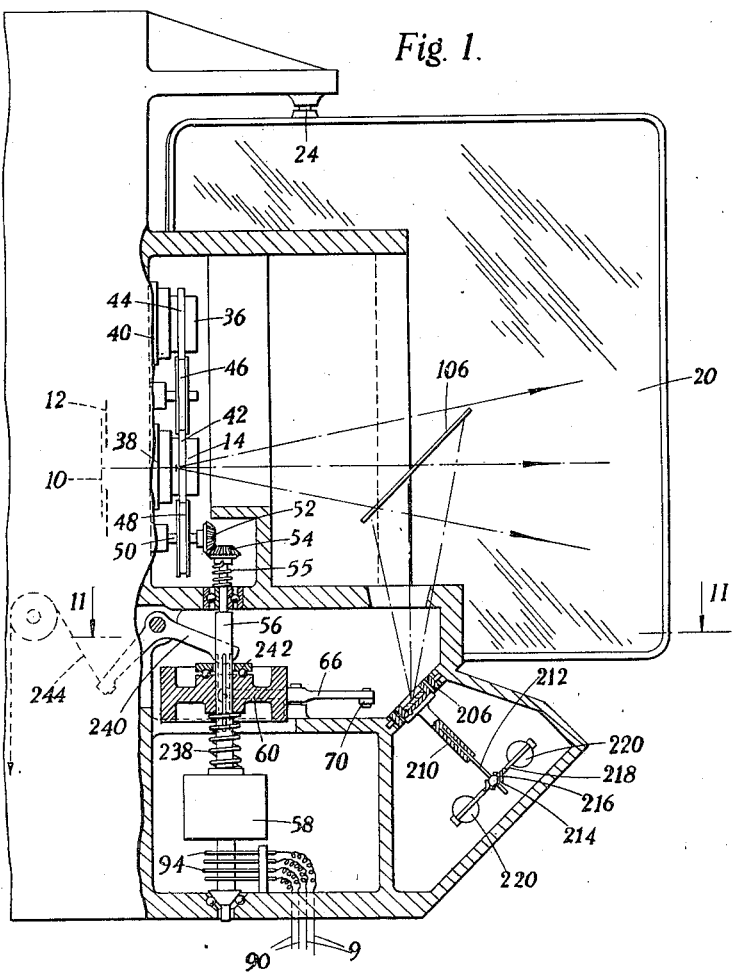

Jan. 25, 1944.  L. H. HUITT  2,339,780
AUTOMATIC FOCUSING DEVICE FOR CAMERAS
Filed Nov. 19, 1940  6 Sheets-Sheet 1

INVENTOR
L. H. HUITT
BY Blair & Kilcoyne
ATTORNEYS

INVENTOR
L. HUITT
BY Blair Kilcoyne
ATTORNEYS

Jan. 25, 1944.    L. H. HUITT    2,339,780
AUTOMATIC FOCUSING DEVICE FOR CAMERAS
Filed Nov. 19, 1940    6 Sheets-Sheet 3
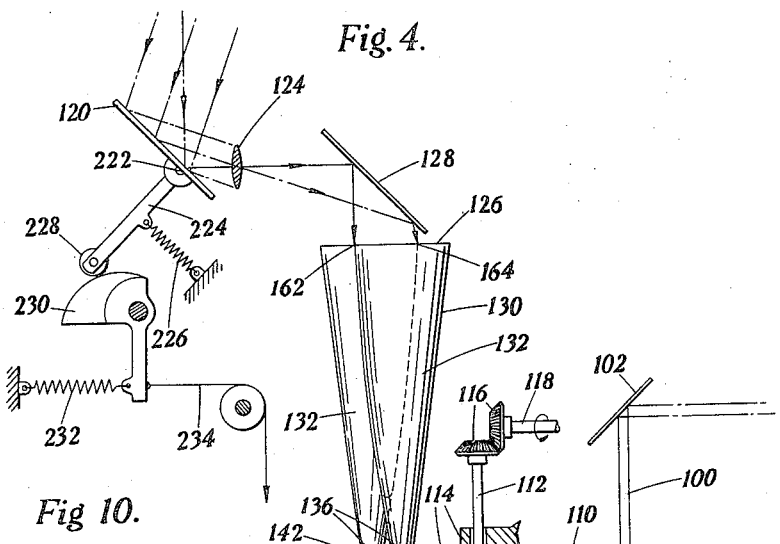
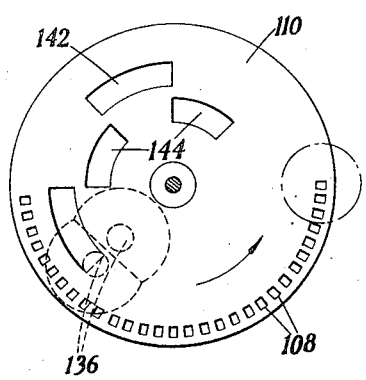
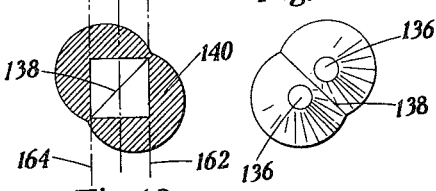
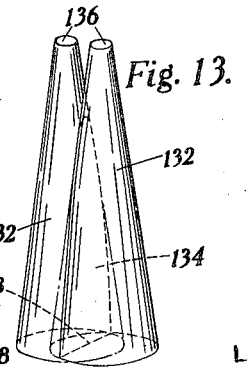
INVENTOR
L. H. HUITT
BY Blair + Kilcoyne
ATTORNEYS Jan. 25, 1944.　　　L. H. HUITT　　　2,339,780
AUTOMATIC FOCUSING DEVICE FOR CAMERAS
Filed Nov. 19, 1940　　　6 Sheets-Sheet 4

INVENTOR
L. H. HUITT
BY Blair+Kilcoyne
ATTORNEYS

Jan. 25, 1944.   L. H. HUITT   2,339,780
AUTOMATIC FOCUSING DEVICE FOR CAMERAS
Filed Nov. 19, 1940   6 Sheets-Sheet 5

INVENTOR
L. H. HUITT
BY Blair + Wilcoyne
ATTORNEYS

Patented Jan. 25, 1944

2,339,780

UNITED STATES PATENT OFFICE 2,339,780

AUTOMATIC FOCUSING DEVICE FOR CAMERAS

Lionel Hubert Huitt, Rangoon, Burma, British India; Royal Bank of Scotland of St. Andrew Square, Edinburgh, executor of said Lionel Hubert Huitt, deceased Application November 19, 1940, Serial No. 366,303
In Great Britain December 7, 1939

12 Claims. (Cl. 95—45)

This invention relates to devices for automatically focusing photographic, television, or other cameras. The invention is particularly applicable to the system of and apparatus for cinematography described in the specification of my co-pending application No. 269,230 issued as Patent No. 2,240,398 on April 21, 1939, in which two images from view-points spaced apart are superimposed on a single film. In this case, the improved focusing device also actuates automatically the "converging" means, that is to say, the means whereby two images of a selected object are brought into coincidence as well as being brought into focus.

According to this invention a projector is provided which projects a beam of high frequency pulsating light on to the field of view of the camera, from a point near the camera lens, there being means whereby this beam can be directed in any direction at will, and a detector is also provided which is displaced laterally from the camera and comprises means for forming an image of that part of the field of view illuminated by the aforesaid beam, hereinafter referred to as the pilot beam, a photo-electric cell which receives light from the aforesaid image, and means responsive to parallactic displacement of the image for actuating the focusing device of the camera lens in accordance with the said displacement.

It will be appreciated that if the pilot beam strikes an object near the camera (the image of the illuminated spot on this object being on the axis of the camera lens), its image in the detector will not be on the axis of its objective, owing to parallax, and the amount of the displacement of this image from the axis will be a function of the distance of the illuminated object from the camera lens, the optical axes of the camera and the detector being parallel. Further, it will be appreciated that the displacement of the image in the detector will always be in the same direction.

Figure 2:
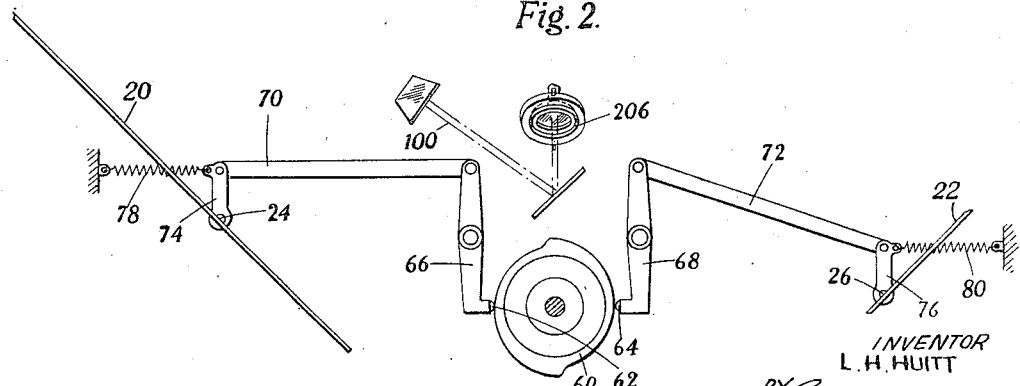
Figure 3:
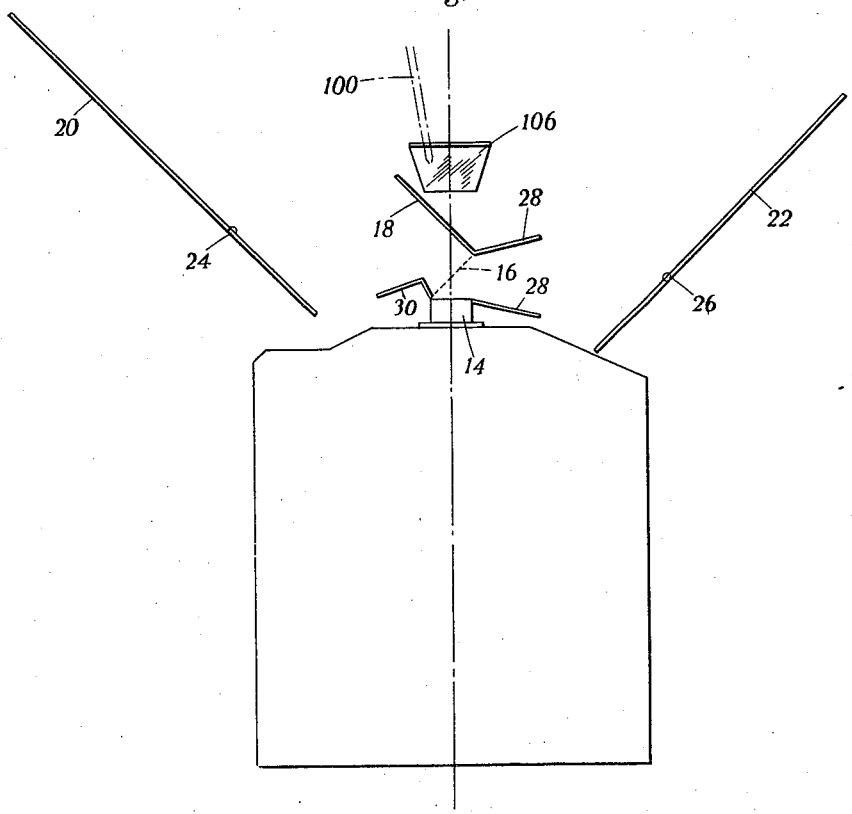
Figure 6:
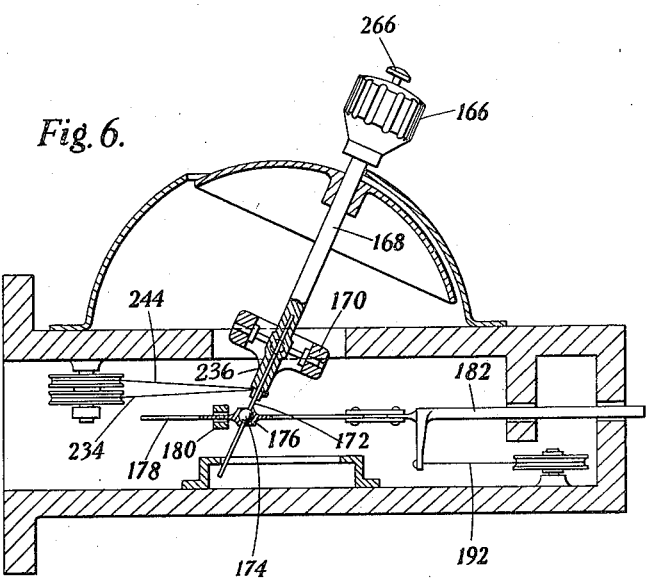
Figure 8:
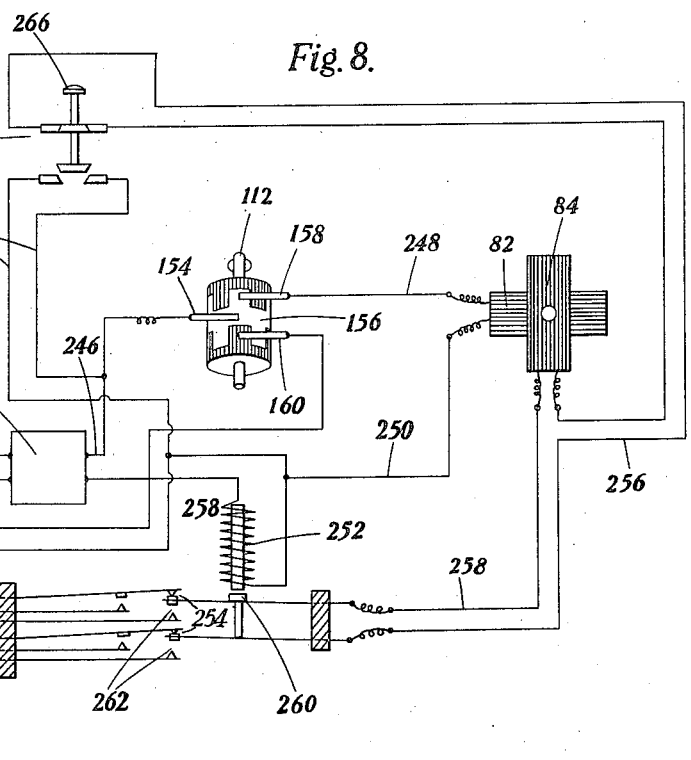
Figure 7:
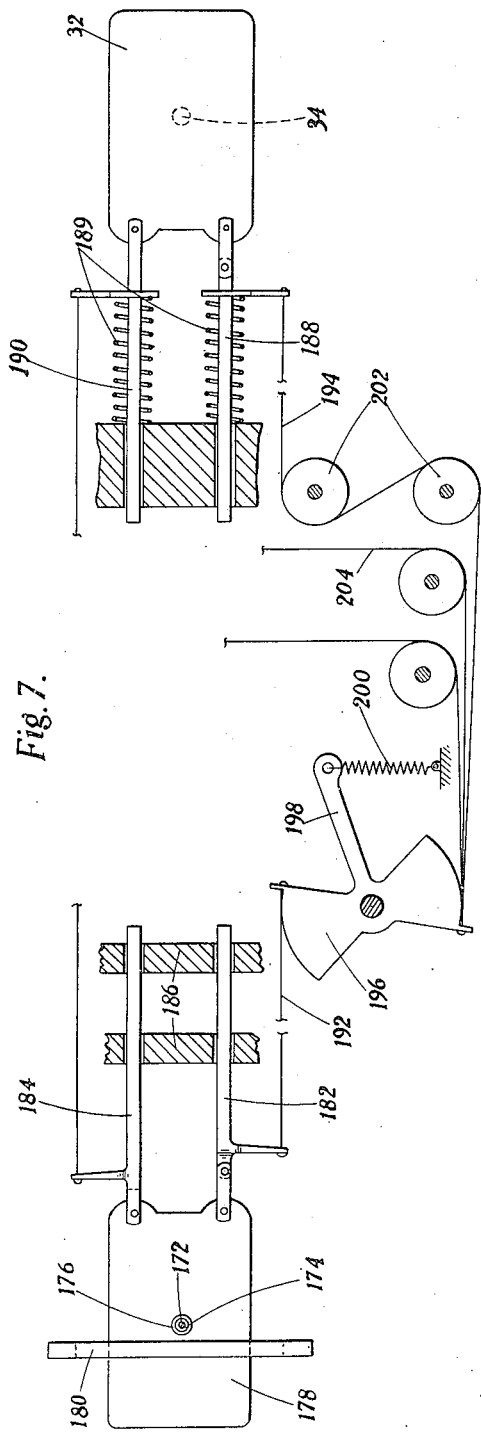
Figure 15:
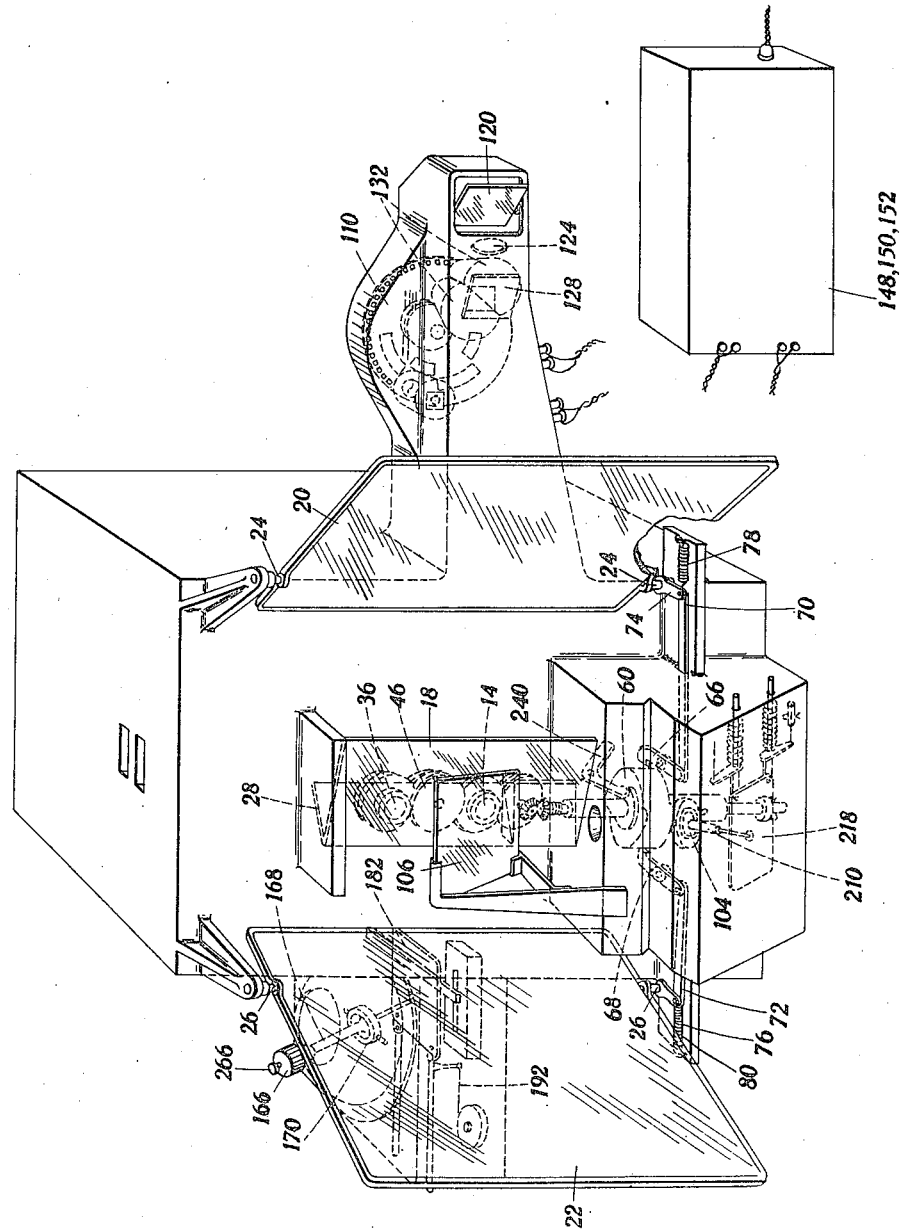

Referring to the accompanying drawings,

Figure 1 is a side elevation partly in section of the front portion of a cinematograph camera according to this invention, Figure 2 is a plan in section on the line II—II in Figure 1, with parts omitted for clearance, Figure 3 is a diagrammatic representation of the camera in plan, Figure 4 represents in plan the means for producing the intermittent pilot beam and the means whereby the light of said beam reflected back from objects on which it falls operates the focusing mechanisms, Figure 5 is a view of the rotating disc shown in Figure 4 looking in the direction of the arrow V in that figure, Figure 6 is a side elevation in section of the manual control device, Figure 7 is a diagram illustrating the connections between the manual control device and other moving parts of the apparatus, Figure 8 is a diagram of the electric circuits, Figures 9 to 14 are representations of various details of the mechanism, and Figure 15 is a perspective view showing the complete camera and automatic control mechanism.

As described in the specification of my co-pending application No. 269,230 issued as Patent No. 2,240,398 on April 21, 1939, a cinematograph film 10 is fed intermittently past a gate 12 as in an ordinary cinematograph camera. Two superimposed images are formed on the film, these images being taken from different viewpoints spaced apart horizontally on either side of the lens. In front of the lens is a transparent membrane 16 (Figure 3) which has a thin reflecting layer of metal on its surface which transmits and reflects equal quantities of light, the membrane being inclined at 45° to the optical axis of the lens. In front of it is a mirror 18 which is fully reflecting and opaque and is inclined also at an angle of 45° to the optical axis but in the opposite direction. This mirror receives light from another mirror 20 which is normally parallel to it. To the right of the membrane 16 is another mirror 22 normally parallel to the membrane. These mirrors form two images in superimposition on the film 10, these images being as seen from the points 24, 26 where the axial rays intersect the mirrors 20, 22. These two mirrors are pivoted about vertical axes passing through the points 24, 26, so that by tilting these two mirrors rays from a point at any desired distance from the camera, after dividing and traversing the alternative opposite paths can be brought together again to form a single-point image on the film 10. Hoods 28, 30 are provided which vignette the margin of the image so that a large central area is fully illuminated, but outside this central area the illumination falls away to zero at the edge of the frame.

Immediately in front of the film 10 is a movable screen 32 (Figure 7) which is of transparent material and has a small central area 34 completely clear so that the light passes through it without division or distortion. The remainder of the screen is light-diffusing in proportion to the radial distance from the clear area 34, for example by reason of its being less and less perfectly polished in proportion to the distance from the area 34, or the surface of the screen may be made wavy or corrugated the depth of the corrugations increasing gradually outwards from the central plane parallel area. In addition, the screen preferably also varies in transparency, the central area 34 being completely transparent and the remainder becoming more opaque towards the margin. Thus, the screen produces what may be termed for convenience a "foveal" area which is well-defined and brightly illuminated, surrounded by an area which becomes progressively more diffused and less well illuminated in proportion to the distance from the foveal area.

Above the lens 14 is a second lens 36 forming part of a view finder. The mirrors 16, 18, 20 and 22 are made large enough in the vertical direction to supply both lenses with light. The superimposed images in the view-finder focal plane will therefore be identical with those on the film 10 except for very slight vertical parallax effects. A second screen (not shown) similar to the screen 32 is mounted in front of the view-finder focal plane and the two screens are connected together and to an actuating knob, in a manner which will be described later, so that both screens can be moved in any direction to the same extent.

Both lenses 14, 36 are focused by screwing them into and out of their mounts 38, 40. Each lens is provided with gear teeth 42, 44 which mesh with a shrouded idler gearwheel 46, so that their focusing adjustments are always the same. The manner in which the lenses are focused will be described hereinafter. In the mechanism described in my aforesaid co-pending application the focusing of the lenses and the tilting of the mirrors 20, 22 were performed by hand; in the improved apparatus according to the present invention they are performed automatically.

A shrouded actuating gearwheel 48 meshes with the teeth 42 on the lens 14, this gearwheel being splined to a shaft 50 which also carries a bevel wheel 52 meshing with a bevel wheel 54 connected by means of a spring 55 to a vertical shaft 56 carrying an armature 58 and also a two-lobed cam 60, shown in plan in Figure 2. The two lobes of this cam are exactly alike and they co-operate with follower balls 62, 64 respectively, mounted in pivoted levers 66, 68 connected by links 70, 72 to arms 74, 76 carried by the mirrors 20, 22 respectively. It will be appreciated that rotation of the shaft 56 will cause both lenses 14, 36 to be rotated for focusing and through the cam 60 it will also cause the mirrors 20, 22 to be tilted to equal extents in opposite directions and if the profile of the cam is adjusted correctly the two images on the film 10 of any point upon which the lenses are focused will be in coincidence. The follower balls 62, 64 are maintained in contact with the surface of the cam by means of tension springs 78, 80.

Figure 9:
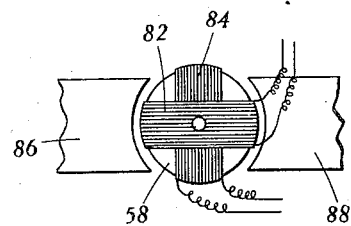

As shown in Figure 9 the armature 58 carries two windings 82, 84 which are at right angles to one another and it is placed between pole-pieces 86, 88 of opposite polarity. The windings 82, 84 are fed separately with current through pairs of leads 90, 92, the connections to the windings being made through fine spiral springs 94. It will be evident that if one of the coils has no current passing through it and the other, for example 84, is energised with current, then the armature will tend to set itself in the angular position in which the axis of the energised coil is in line with the pole-pieces 86, 88, as shown in Figure 9. If the conditions are reversed, that is to say, if the coil 82 is energised and the coil 84 is de-energised, the armature will set itself in a position at right angles to its first position. If both coils are equally energised the armature will set itself to the position 45° to either of its extreme positions and in general the angular position of the armature, and therefore the focusing setting of the lenses and the angle of tilt of the mirrors 20 and 22, will depend upon the ratio of the strength of the currents passing around the two coils 82, 84.

Referring now particularly to Figure 4, a lamp 96 and a lens 98 project a narrow high intensity parallel beam of light 100. This beam is reflected from a mirror 102 on to a universally pivoted mirror 104 from which it is reflected vertically upwards on to a mirror 106 placed immediately in front of the mirror 18, from which it is reflected outwards on to the field of view of the camera. The distance between the centre of the mirror 106 and the centre of the pivoted mirror 104 is made approximately equal to the distance between the centre of the mirror 106 and the front principal point of the lens 14, for a reason which will be explained hereinafter.

The beam 100, hereinafter referred to as the "pilot beam," passes through a number of closely spaced apertures 108 (Figure 5) equally spaced around one half of the periphery of a disc 110 which is carried by a shaft 112 mounted in bearings 114 and driven by bevel gearing 116 and a shaft 118 in synchronism with the camera shutter. The connections between the shaft 118 and the camera shutter are not shown, but of course any person skilled in the art will appreciate how such connection can be made. The connection is such that during the exposure periods, when the lens 14 is uncovered, the unperforated half of the disc 110 is interposed in the beam 100, the apertures 108 allowing the beam to pass at high frequency only during the periods when the lens is covered by its shutter. Thus, the illumination by the pilot beam of the part of the scene on which this beam falls is not registered on the film.

A part of the light of the pilot beam scattered or reflected by objects in the field of view upon which it falls, is received by a mirror 120 situated well to one side of the camera. The reflecting face of this mirror is formed with horizontal corrugations 122 (Figure 10) which scatter the reflected light in the vertical direction. After reflection at this mirror the light falls upon a lens 124 which forms an image in the plane 126 (another oblique mirror 128 being interposed) of the pilot beam spot—that is to say, a small area of the field of view illuminated by the pilot beam. Owing to the corrugated surface of the mirror 120 the image of the pilot beam spot in the plane 126 is in the form of a vertical line or narrow strip. The same effect could be obtained by making the mirror 120 cylindrically curved or by using a lens with cylindrical surfaces in place of the lens 124 which has spherical surfaces.

The image is received on the front surface of a light-collecting and splitting device 130 shown in more detail in Figures 11 to 14. This device consists of two truncated cones 132 of glass or other transparent material from which portions have been removed to provide plane surfaces 134 parallel to the axes of the cones. These two surfaces 134 are placed together—see Figures 13 and 14—so that the smaller ends 136 of the cones are separate. The straight dividing line 138 between the surfaces of the two larger ends is placed obliquely (Figures 11 and 14) and these surfaces are masked off at 140 so as to disclose only a rectangular area of which the line 138 is a diagonal.

It will be appreciated that light falling on the square aperture of this device will be divided into two portions, and, in passing through the two cones, any light which falls on the interior conical surfaces will be totally reflected because the angle of incidence is much greater than the critical angle of the material. No light entering a cone can, therefore, escape from that cone until it emerges at its smaller end. Any light which falls on one side of the diagonal 138 will emerge at the smaller end of one of the cones, while light which falls on the other side of the diagonal will emerge from the smaller end of the other cone.

As shown in Figures 4 and 5 the smaller ends of the cones are situated just in front of the rotating disc 110 and they lie at different radial distances. Arcuate apertures 142, 144 are cut in the disc, these apertures alternating with one another as clearly shown in Figure 5. One of the apertures 142 begins to uncover the smaller end of the outermost of the two cones at the moment when the first of the apertures 108 uncovers the beam 100, and the second of the apertures 144 ceases to expose the smaller end of the inner of the two cones at the moment when the last of the apertures 108 is in register with the beam 100. Behind the disc 110, opposite the small ends of the cones 132 is a photo-electric cell 146 which receives light impulses from both cones, these impulses alternating with one another owing to the alternate positioning of the apertures 142, 144. In addition, these impulses are discontinuous owing to the interruption of the pilot beam at high frequency by the opaque bars separating the apertures 108. Owing to the high frequency character of the light impulses, the electrical impulses generated in the photo-electric cell can be detected and separated out from the continuous current produced by the general illumination of the field of view, part of which also falls on the photo-electric cell. The means for effecting this need not be described in detail; in Figure 8 an amplifier and filter circuit arrangement is indicated at 148, a second amplifier at 150 and a rectifier and smoothing device at 152. The output from this is fed to a brush 154 co-operating with a commutator 156 mounted on the shaft 112 which carries the disc 110—see Figure 4. The conducting part of the commutator is continuous in the zone swept by the brush 154 and is discontinuous in two other zones swept respectively by two further brushes 158, 160. The discontinuities in these zones is such that when the apertures 142 are in register with the outer one of the two cones 132 the output from 152 is fed to the brush 158, while when the apertures 144 are in register with the inner one of the two cones the output is fed to the brush 160. The brush 158 is in the circuit of the coil 82 previously referred to and the brush 160 is in the circuit of the coil 84. Thus, any light which falls on the outer one of the two cones causes electrical impulses from the photo-electric cell to energise the coil 82 while light falling on the other or inner cone causes the other coil 84 to be energised.

Returning to Figure 4, it will be evident that if the pilot beam strikes an object at a great distance the direction of the light striking the mirror 120 will be substantially parallel to the axis of the camera lens 14 and the image of the pilot beam spot will be formed at the position 162, the arrangement being such that this position is at the extreme edge of the square aperture in the mask 140. If the pilot beam strikes an object near to the camera, at a distance corresponding to the limit of the focusing range of the camera lens, the direction of the light striking the mirror 120 will be inclined to the axis of the camera lens and the image will be formed at the position 164 at the other edge of the aperture. At intermediate distances the image will occupy different positions across the aperture. When it is in the position 162 all the light enters the outer one of the two cones and therefore it all passes through the apertures 142 with the result that the coil 82 is energised but the coil 84 is not. When the image is in its other extreme position at 164 all the light will enter the other cone, will pass through the apertures 144 and will cause the coil 84 to be energised, the coil 82 being de-energised. At any intermediate position some of the light will enter one cone and the remainder will enter the other cone and the ratio of the intensities of light passing through the two cones will depend on the position of the image across the aperture and therefore upon the distance of the pilot beam spot from the camera.

It has been explained that the angular position of the armature 58 is determined by the ratio of the intensities of the currents flowing through the two coils 82, 84, and it has also been explained how this ratio depends on the distance of the pilot beam spot. Hence, it is clear that by suitably proportioning the various parts the lenses 14, 36 can be automatically maintained in focus on the pilot beam spot, whatever the distance of this spot from the camera. It will also be clear that by suitable choice of the contour of the cam 60, controlling the angular positions of the mirrors 20, 22, the two images of the pilot beam spot on the film 10 may be automatically maintained in coincidence.

The current flowing through the coil 82 or 84 is intermittent or discontinuous and the tendency therefore is for the armature 58 to vibrate angularly. This vibration is, however, heavily damped by the inertia of the parts carried by the shaft 56 and by the spring 55. In addition, the armature 58 may be mounted on a rubber sleeve surrounding the shaft 56. With these precautions no appreciable vibration will be transmitted through the bevel wheels 52, 54 to the lenses 14, 36.

In the description so far it has been assumed that the pilot beam is fixed in direction, being parallel to the axis of the camera lens. Actually, means now to be described are provided whereby its direction may be changed at will so that it always strikes the point in the field of view the image of which falls upon the foveal area 34, wherever this area may be. The two foveal area screens, one of which is indicated at 32, are connected to a movable control knob 166, similar to the control knob 110 of my co-pending application hereinbefore referred to, except that the control knob does not now rotate about its longitudinal axis, because the focusing adjustment is now effected automatically. The control knob 166 is fixed to a lever 168 pivoted universally in gimbals 170. At its lower end it is bored to receive a sliding rod 172 on which is a ball 174 seated in a socket 176 in a plate 178 free to move in any direction in its own plane in guides 180 and pivotally connected to two rods 182, 184 sliding in guides 186. These rods are connected to similar rods 188, 190 pivotally connected to the frame of the screen 32, and in a precisely similar manner to rods pivoted to the screen already referred to in the focal plane of the finder lens 36. Only the connection between the rods 182 and 188 is shown; this connection consists of cables 192, 194 connected to a pivoted double sector 196 provided with an arm 198 to which a spring 200 is attached for the purpose of maintaining the cable in tension. The cable 194 is led over guide pulleys 202. The connection between the rods 184 and 190 is of a similar nature. By these means any movement of the socket 176 imparted to it by moving the control knob 166 is duplicated exactly by the foveal area 34 of the screen 32 and also by the foveal area of the screen in the focal plane of the finder lens. The cable for actuating the finder screen is indicated at 204; it is attached to the sector 196 at the same point as the cable 194.

The mirror 104, Figures 1 and 2, is free to tilt in all directions, being mounted in a gimbal ring 206. Attached to it is a lever 210 bored to receive a sliding rod 212 on which is a ball 214 working in a socket 216 in a plate 218 which is mounted in a manner exactly similar to the mounting of the plate 178 or the screen 32, Figure 7. The sliding rods 220 linked to this plate are connected to the sliding rods 182 and 184 in the same way as are the sliding rods 188, 190, Figure 7. It may here be mentioned that the connections between the rod 184 and the parts which it actuates are the same as the connections shown in the lower part of Figure 7 between the rod 182 and the parts which it actuates. The cables attached to the rods 188, 190 are maintained tensioned by light springs 189, and similar springs are used for the rods 220, Figure 1. It will be seen that by these means the mirror 104 is automatically tilted in various directions in precise conformity with the movements of the foveal area 34, with the result that the pilot beam reflected upwards from it is swung in various directions, and is therefore reflected from the mirror 106 out into the field of view towards the various points thereof. The pilot beam is projected on to the mirror 104, so that its central or mean ray strikes and is reflected from the centre of the mirror, which centre is also the point where the axes of the gimbal ring intersect. It is evident that by correctly choosing the distance between the ball 214 and the intersection of the axes of the gimbal ring 206, the pilot beam can be made to strike that part of the field of view the image of which falls upon the foveal area 34. It has been mentioned already that the distance between the centre of the mirror 104 and the indicated centre of the mirror 106 is equal to the distance between the latter centre and the front principal point of the lens 14. The purpose of this is to ensure that the pilot beam after reflection from the mirror 106 will appear to proceed from the front principal point of the lens, whatever its direction may be.

It will be seen that if the mirror 120, Figure 4, is stationary, the light from the pilot beam spot will fall upon it at different angles according to the position to which this spot has been moved by manipulating the knob 166. This would cause the line image in the plane 126 to move from side to side in a manner unrelated to the distance between the camera lens and the object illuminated by the pilot beam spot. This is avoided by pivoting the mirror 120 about a vertical axis 222 and swinging the mirror about this axis in conformity with the movements of the foveal area screen and the mirror 104. As shown in Figure 4, an arm 224 biased by a spring 226 is attached to the mirror 120 and a follower roller 228 of the arm co-operates with a cam 230 also biased by a spring 232 and connected by a cable 234 to a lever 236 attached to the gimbal ring 170 in which the lever 168 is pivoted. In this way the mirror 120 is caused to swing in accordance with the horizontal component of the movement of the plate 178 and by suitable choice of the cam contour and the length of the arm 224 the movement of the line image, referred to above, consequent on the lateral movement of the pilot beam spot, is compensated. In other words, if the pilot beam spot swings from side to side, always falling on objects at the same distance from the camera lens, the light after reflection from the mirror 120 will be constant in direction and the line image will fall at its appropriate place in the aperture in the mask 140. Movement of this image across the aperture can therefore be caused only by a change in the distance from the camera lens of the object upon which the pilot beam falls. The mirror 120 does not tilt about a horizontal axis; it takes no account of the vertical component of the movement of the pilot beam spot. This is because the receiving apparatus 130, 132, 146 is likewise arranged not to respond to such vertical movements. As already explained, the mirror 120 is corrugated horizontally so as to draw out the image formed by the lens 124 into a vertical line or strip, and the length of this line image is large compared with the extent of vertical movement of the pilot beam spot. Hence, the image is independent of such movement.

It has been stated that the two lobes of the cam 60, Figure 2, are alike, thereby tilting the mirrors 20, 22 through equal angles in opposite directions. This is correct so long as the pilot beam spot and the foveal area are anywhere in a vertical plane containing the axis of the camera lens. If the pilot beam spot (and of course the foveal area) should be to one side or other of this vertical plane, one of the mirrors should tilt slightly more, and the other slightly less, than the amount appropriate to the particular distance from the lens of the object illuminated. This is provided for by making the surface of the cam 60 broad in the direction parallel to its axis of rotation, various zones of the cam being differently shaped and by moving the cam along the shaft 56 on which it is mounted in conformity with the horizontal component of movement of the foveal area. As shown in Figure 1, the cam 60 is splined to the shaft 56, is biased upwardly by means of a spring 238 and is moved downwardly by means of a bell-crank 240, operating through a ball thrust washer 242. The bell-crank is connected by a cable 244 to the lever 236, Figure 6, to which reference has already been made. In Figure 1 the bell-crank and the cam are shown in the position which they occupy when the foveal area is central horizontally and the lever 168 is vertical as viewed in Figure 6. In this position the follower balls 62, 64 are resting on the central zone of the cam and in this position (which is that shown in Figure 2) the two lobes of the cam are exactly the same. As the cam is raised or lowered as a consequence of the movement of the knob 166, Figure 6, to the right or the left, the parts of the cam which are brought into co-operation with the follower balls 62, 64 change their shape progressively, the two lobes becoming more and more unequal, the inequality being of opposite sign in the upper and lower parts of the cam. Thus, the required variable inequalities of tilting in the mirrors 20, 22 are automatically brought about.

It will be understood that when the object on which the pilot beam falls is very distant its image formed by the lens 124 may not be bright enough to generate any appreciable current in the photo-electric cell 146. In these circumstances neither of the coils 82, 84 would be energised. To provide against this the circuit arrangement shown in Figure 8 is employed. As already described, one of the output leads, 246, from the rectifier 152 is connected to the brush 154 and the commutator 156 divides the current, which passes alternately to the brushes 158 and 160. The brush 158 is connected through a wire 248 to the coil 82, the current returning through the wire 250 through the winding 252 of an electromagnet, to the other terminal of the rectifier. Thus, when any current is flowing through the coil 82 the electromagnet 252 is energised, closing contacts 254. This completes the circuit through the other armature coil 84 from the brush 160, by way of the wire 256, 258, the current in these wires returning to the other terminal of the rectifier 152 through the winding 252. Thus, so long as the photo-electric cell is receiving light above a certain intensity the electromagnet 252 will remain energised, the contacts 254 will be closed and the coils 82, 84 will be energised in the correct ratio depending on the distance of the object illuminated by the pilot beam. If this object is very far away, so that the output from the photo-electric cell falls to a level at which the electromagnet 252 can no longer hold the contacts 254 closed, the armature 260 falls away and contacts 262 are closed to bring an auxiliary current supply 264 into circuit with the coil 84 so that the armature 58 is rotated into the position for infinity.

A press-button 266 is provided on the knob 166. As shown in Figure 8 the depression of this button short circuits the coils 82, 84, but not the electromagnet winding 252, through the wires 268. It also opens normally closed contacts 270 in the circuit 256 through the coil 84, thereby preventing current from the source 264 from flowing through this coil. By depressing the button 266, therefore, the operator can hold the focusing and converging adjustments in the positions that they occupy at any moment. This is desirable when he wishes to transfer the pilot beam spot from one isolated object to another, to avoid an unnecessary and undesirable change of focus while the spot is traversing the gap between these objects.

It has been stated that the coils 82, 84 are arranged at right-angles to one another on the armature 58. It is, however, desirable that the angle between them should be a little less than 90°, so that when one coil is carrying the whole of the current and has set itself with its axis in line with the pole-pieces 86, 88, the other coil will not be in its dead centre position. If it were in this position and current were supplied to it, it would in theory have no tendency to turn in either direction and in practice might turn in the reverse direction thereby operating the focusing and coincidence adjustments incorrectly. Another way of avoiding this possibility is to provide resilient stops which come into action just before the armature reaches either limit of its total range of 90°. The compression of these stops during the final stage of the movement will provide a bias which will initiate the reverse movement when the energisation of the coils is reversed.

The armature 58 is not fixed rigidly to the shaft 56 but is connected to it through a resilient coupling, for example a rubber sleeve, to damp out any small high frequency vibrations which may be set up in the armature on account of the pulsating character of the current. This will allow the armature to rotate the shaft but will prevent such vibrations being transmitted through the shaft to the focusing gear or to the cam 60. Similarly, the cam follower balls 62, 64 are preferably attached to the arms 66, 68 through rubber or like cushions so that if the cam should be rotated very quickly no shock is transmitted to the mirrors 20, 22.

The detector described above needs only one photoelectric cell, the staggered or alternating apertures 142, 144, and the commutator 156 serving to discriminate between current due to light passing through one half of the light-splitting device and that passing through the other half. The use of a single photo-electric cell has advantages, notably that the response of the cell to equal amounts of light in the two portions into which it is split or divided, is necessarily the same. It will be evident, however, that two photo-electric cells could be used, one for each of the halves of the light-splitting device, in which case the output of each cell after amplification would be fed to one or other of the armature coils 82 or 84. In this case no shutter would be interposed between the light-splitting device and the photo-electric cells.

Instead of interrupting the pilot beam completely during the exposure periods of a cinematograph or television camera the light of the pilot beam may be of a range of wave lengths to which the film or other receptive surface is not sensitive, or a suitable filter may be employed to prevent the light from the pilot beam spot from reaching the film or receptive surface. In the case of a still camera a similar arrangement may be used, or the pilot beam may be extinguished or interrupted at the moment of exposure.

I claim:

1. A device for automatically focusing a photographic, television or other camera comprising a projector which originates a pilot beam of high frequency pulsating light in the field of view of the camera from a point near the camera lens, movable reflecting means for said beam whereby said beam can be projected in any direction at will, a detector displaced laterally from the camera and comprising means for forming an image of that spot of the field of view illuminated by the aforesaid beam, and a device including an image-receiving aperture and a photo-electric cell responsive to parallactic displacement of the image relative to spacing of the field from the lens for actuating the focusing devices of the camera lens in accordance with the said displacement.

2. An automatic focusing device according to claim 1 wherein the detector includes means for forming a vertically extended image of the pilot beam spot and wherein this image is received on the aperture, which aperture is divided into two parts by an obliquely disposed dividing line whereby the extended image is divided into two portions the ratio of which varies according to the parallactic displacement of the image across the aperture, the device being so arranged that all light falling on one side of the dividing line is directed to one position and all light falling on the other side of the dividing line is directed to a different position, whereby the photoelectric effects of the two portions into which the light in the image is divided can be distinguished for focus and converger control.

3. An automatic focusing device according to claim 1 wherein the detector includes a mirror pivoted about a vertical axis and operatively connected to the means for directing the pilot beam in any direction at will, whereby the direction in which the light from the pilot beam spot enters the detector is independent of the direction in which the pilot beam is directed.

4. An automatic focusing device according to claim 1 applied to a cinematograph or television camera wherein the high frequency pulsations of the light of the pilot beam are produced by a rotating shutter geared to the camera shutter and having a number of closely-spaced apertures in that part of it which intercepts the pilot beam during the periods when the camera lens is covered by its shutter, the pilot beam being interrupted by the unperforated part of the rotating shutter during the exposure periods.

5. A cinematograph or television camera provided with an automatic focusing device according to claim 1 provided with a screen in front of the focal plane of the camera lens having a small central area which is clear and transparent but the remainder of which is light-diffusing in proportion to the radial distance from the clear area, said screen being movable in all directions transverse to the optical axis of the camera lens and being interconnected with the means for directing the pilot beam in any direction in such a way that the image of the part of the field of view on which the pilot beam falls is always formed in the central clear transparent area of the screen.

6. A device for automatically focusing a photographic, television or other camera provided with means for superimposing two images from viewpoints spaced apart on a single film, comprising a projector which originates a pilot beam for the field of view of the camera from a point near the camera lens, movable reflecting means for said beam whereby said beam can be projected in any direction at will, a detector displaced laterally from the camera, means for forming an image of a pilot beam spot and an image-receiving and light splitting device including a photoelectric cell responsive to parallactic displacement of the image relative to spacing of the field from the lens for actuating the focusing device of the camera lens in accordance with the said displacement and means actuated by said device whereby the two images of the object on which the pilot beam spot falls are brought into coincidence.

7. A device for automatically focusing a photographic, television or other camera comprising a projector which originates a pilot beam in the field of view of the camera from a point near the camera lens, movable reflecting means whereby said beam can be projected in any direction at will, a detector including means for forming a vertically extended image of a pilot beam spot, a light collecting and splitting device having an aperture for receiving said image, which aperture is divided into two parts by an obliquely disposed dividing line whereby the extended image is divided into two portions, the ratio of which varies according to the parallactic displacement of the image across the aperture relative to spacing of the field from the lens, the device being so arranged that all light falling on one side of the dividing line is directed to one position and all light falling on the other side is directed to a different position, a rotating shutter driven with a commutator, and having two sets of apertures staggered in relation to one another, one set registering with one of the aforesaid positions and the other set registering with the other of said positions, a single photoelectric cell arranged to receive light from both portions of the image through said apertures and the output from the photoelectric cell being passed through the commutator, said commutator having two sets of segments each synchronized with the apertures of one or other of the two sets, whereby the current taken from one set of segments is derived wholly from one of the two portions of the light from the image and the current from the other set of segments is derived from the light in the other portion of the image.

8. A device for automatically focusing a photographic, television or other camera comprising a projector which originates a pilot beam of high frequency pulsating light for the field of view of the camera from a point near the camera lens, movable reflecting means for said beam whereby said beam can be projected in any direction at will, a detector displaced laterally from the camera and comprising means for forming an image of that spot of the field of view illuminated by the aforesaid beam, and an image-receiving and splitting device including a single photoelectric cell arranged to receive light from both portions of the image, said device including apertures in a rotating shutter driven with a commutator, there being two sets of apertures staggered in relation to one another, one set registering with one of the aforesaid portions and the other set registering with the other of said portions and the output from the photoelectric cell being passed through the commutator which has two sets of segments each synchronized with the apertures of one or other of the two sets, whereby the current taken from one set of segments is derived wholly from one of the two portions of the image and the current from the other set of segments is derived from the other portion of the image, wherein the focusing device is actuated by an armature free to rotate in a magnetic field and having two windings at right angles to one another or substantially so, one of the said windings being fed with current from one set of commutator segments and the other being fed with current from the other set of commutator segments, whereby the angular position of the armature, and therefore the focusing setting of the camera lens, is varied in accordance with the relative strengths of the two currents and therefore in accordance with the light ratio between the two parts into which the image has been divided as a result of its parallactic displacement relative to spacing of the field from the lens.

9. A device for automatically focusing a photographic, television or other camera having two mirrors pivoted about vertical axes for bringing the two images into coincidence, comprising a projector which originates a pilot beam for the field of view of the camera from a point near the camera lens, movable reflecting means whereby said beam can be projected in any direction at will, a detector displaced laterally from the camera, means for forming an image of a pilot beam spot and an image-receiving and splitting device including a photoelectric cell responsive to parallactic displacement of the image relative to spacing of the field from the lens, wherein the focusing device is actuated by an armature free to rotate in a magnetic field and having two windings at right angles to one another or substantially so, one of the said windings being fed with current from one set of commutator segments and the other being fed with current from the other set of commutator segments, whereby the angular position of the armature, and therefore the focusing setting of the camera lens, is varied in accordance with the relative strengths of the two currents and therefore in accordance with the light ratio between the parts into which the image is split, and wherein the armature is operatively connected to the two mirrors by means of a two-lobed cam fixed to the armature cooperating with pivoted levers linked to the mirrors.

10. A device for automatically focusing a photographic, television or other camera comprising a projector which originates a pilot beam for the field of view of the camera from a point near the camera lens, reflecting means for said beam whereby said beam can be projected in any direction at all, a detector including means for forming a vertically extended image of the pilot beam spot, means for directing this image on to the aperture of a light collecting and splitting device, said device comprising two blocks of transparent material of tapering, conical shape having polished side and end surfaces, each block being formed with a flat surface for a part of its length which is parallel to the axis of symmetry of the block and the two flat surfaces being placed together whereby light falling on the larger end faces of the blocks is collected by internal reflection at the side surfaces thereof and emerges through the smaller end faces, which aperture is divided into two parts by an obliquely disposed dividing line whereby the extended image is divided into two portions, the light ratio of which portions varies according to the parallactic displacement of the image across the aperture, the device being so arranged that all light falling on one side of the dividing line is directed to one position and all light falling on the other side is directed to a different position and whereby a single photoelectric cell is arranged to receive light from both portions of the image a rotating shutter moving with a commutator and having apertures to admit such light, there being two sets of said apertures staggered in relation to one another, one set registering with one of the aforesaid positions and the other set registering with the other of said positions and the output from the photoelectric cell being passed through the commutator, such commutator having two sets of segments each synchronized with the apertures of one or other of the two sets, whereby the current taken from one set of segments is derived wholly from one of the two portions of the light from the image and the current from the other set of segments is derived from the light in the other portion of the image.

11. An automatic focusing device according to claim 1 applied to a cinematograph or television camera wherein the high frequency pulsations of the light and of the pilot beam are produced by a single rotating shutter geared to the camera shutter and having a number of closely spaced apertures in that part of it which intercepts the pilot beam during the periods when the camera lens is covered by its shutter, the pilot beam being interrupted by the unperforated part of the rotating shutter during the exposure periods, and having apertures for causing the pulsations of the light of the pilot beam and other apertures for admitting light to the photoelectric cell.

12. A cinematograph or television camera provided with an automatic focusing device according to claim 1, provided with a screen in front of the focal plane of the camera lens having a small central area which is clear and transparent but the remainder of which is light-diffusing in proportion to the radial distance from the clear area, said screen being movable in all directions transverse to the optical axis of the camera lens and being interconnected with the means for directing the pilot beam in any direction in such a way that the image of the part of the field of view on which the pilot beam falls is always formed in the central clear transparent area of the screen, and having a finder lens similar to the camera lens and a screen in front of its focal plane and interconnected camera lens screen so that its movements are the same.

L. H. HUITT.